United States Patent
Flinta et al.

(10) Patent No.: US 9,531,630 B2
(45) Date of Patent: Dec. 27, 2016

(54) CAPACITY ESTIMATES USING BURST-TRAILER TRAINS

(75) Inventors: Christofer Flinta, Stockholm (SE); Pal Dammvik, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 23 days.

(21) Appl. No.: 14/371,018

(22) PCT Filed: Feb. 20, 2012

(86) PCT No.: PCT/SE2012/050184
§ 371 (c)(1),
(2), (4) Date: Jul. 8, 2014

(87) PCT Pub. No.: WO2013/125989
PCT Pub. Date: Aug. 29, 2013

(65) Prior Publication Data
US 2015/0016250 A1    Jan. 15, 2015

(51) Int. Cl.
*H04J 3/14* (2006.01)
*H04L 12/801* (2013.01)
(Continued)

(52) U.S. Cl.
CPC ........... *H04L 47/12* (2013.01); *H04L 43/0888* (2013.01); *H04L 43/103* (2013.01); *H04L 47/34* (2013.01); *H04L 69/28* (2013.01); *H04N 21/2402* (2013.01)

(58) Field of Classification Search
CPC ...... H04L 47/12; H04L 47/34; H04L 43/0888; H04L 43/0894; H04L 43/103; H04L 69/28; H04N 21/2402
See application file for complete search history.

(56) References Cited

U.S. PATENT DOCUMENTS

| | | | | |
|---|---|---|---|---|
| 6,031,821 A | * | 2/2000 | Kalkunte | H04L 47/10 370/235 |
| 6,298,070 B1 | * | 10/2001 | Carlson | H04L 47/10 370/465 |

(Continued)

FOREIGN PATENT DOCUMENTS

| | | |
|---|---|---|
| EP | 1309151 A2 | 5/2003 |
| WO | 2011/112126 A1 | 9/2011 |

OTHER PUBLICATIONS

Svante Ekelin, et al.; "Real-Time Measurement of End-to-End Available Bandwidth using Kalman Filtering"; Network Operations and Management Symposium, 2006; NOMS 2006; 10th IEEE/FIP; Apr. 3-7, 2006; pp. 73-84; Vancouver, Canada.

(Continued)

*Primary Examiner* — Kevin Mew
(74) *Attorney, Agent, or Firm* — Patent Portfolio Builders PLLC

(57) ABSTRACT

The present invention relates to methods and devices (11, 12, 14) for transmitting a sequence of data packets in a network. To this end, a send rate with which the sequence is to be transmitted is selected. Then, a first set of data packets of the sequence is transmitted and the transmission is associated with a time stamp. Finally a last data packet of the sequence is transmitted after a predetermined time interval has elapsed from the time stamp associated with the first set of data packets, where said predetermined time interval is the time required for transmitting the sequence of data packets with the selected send rate.

19 Claims, 4 Drawing Sheets

(51) Int. Cl.
*H04L 12/26* (2006.01)
*H04L 29/06* (2006.01)
*H04N 21/24* (2011.01)

(56) References Cited

U.S. PATENT DOCUMENTS

| | | | | |
|---|---|---|---|---|
| 6,876,952 B1* | 4/2005 | Kappler | ................ | H04L 1/0018 |
| | | | | 370/218 |
| 7,035,220 B1* | 4/2006 | Simcoe | ................... | H04L 47/10 |
| | | | | 370/236 |
| 7,860,005 B2* | 12/2010 | Cakareski | ............... | H04L 29/06 |
| | | | | 370/230 |
| 8,441,943 B2* | 5/2013 | Kyusojin | ............ | H04L 43/0864 |
| | | | | 370/248 |
| 8,804,508 B1* | 8/2014 | Hobbs | ................ | H04N 21/2402 |
| | | | | 370/230 |
| 9,106,551 B2* | 8/2015 | Neghina | ............... | H04L 43/106 |
| 2002/0024970 A1* | 2/2002 | Amaral | ................. | H04J 3/0632 |
| | | | | 370/468 |
| 2002/0024973 A1* | 2/2002 | Tavana | ................. | H04J 3/0697 |
| | | | | 370/508 |
| 2003/0016630 A1* | 1/2003 | Vega-Garcia | ........... | H04L 29/06 |
| | | | | 370/252 |
| 2003/0152084 A1* | 8/2003 | Lee | ........................ | G06F 9/3885 |
| | | | | 370/395.21 |
| 2003/0202482 A1* | 10/2003 | Dittmann | ................ | H04L 69/28 |
| | | | | 370/252 |
| 2005/0228896 A1* | 10/2005 | Nishida | ................. | H04L 1/0007 |
| | | | | 709/230 |
| 2006/0182039 A1 | 8/2006 | Jourdain et al. | | |
| 2006/0187827 A1* | 8/2006 | Smith | ..................... | H04L 47/10 |
| | | | | 370/229 |
| 2006/0187839 A1* | 8/2006 | Smith | ..................... | H04L 47/10 |
| | | | | 370/235 |
| 2006/0202855 A1* | 9/2006 | Salazar Cardozo | ... | G01D 4/004 |
| | | | | 340/870.02 |
| 2006/0215556 A1* | 9/2006 | Wu | ........................ | H04W 4/12 |
| | | | | 370/230 |
| 2007/0070959 A1* | 3/2007 | Almeroth | .............. | H04W 40/28 |
| | | | | 370/338 |
| 2007/0115849 A1 | 5/2007 | Ekelin et al. | | |
| 2008/0205442 A1* | 8/2008 | El Kolli | ............ | H04L 12/40065 |
| | | | | 370/468 |
| 2010/0110922 A1* | 5/2010 | Ketheesan | .......... | H04L 43/0858 |
| | | | | 370/252 |
| 2010/0309934 A1* | 12/2010 | Umayabashi | ............. | H03L 7/06 |
| | | | | 370/509 |
| 2011/0069621 A1* | 3/2011 | Gintis | ................. | H04L 12/2697 |
| | | | | 370/250 |
| 2012/0281715 A1* | 11/2012 | Shojania | ............. | H04L 12/2671 |
| | | | | 370/468 |
| 2012/0314569 A1* | 12/2012 | Liu | ................... | H04W 36/0094 |
| | | | | 370/230 |

OTHER PUBLICATIONS

Bob Melander, et al.; "Regression-Based Available Bandwidth Measurements"; Dept of Computer Systems, Uppsala University; Conference paper; Proc of the 2002 International Symposium on Performance Evaluation of Computer and Telecommunications; [permanent link—http://urn.kb.se/resolve?urn=urn:nbn:se:uu:diva-45439]; 2002; pp. 1-25; Uppsala, Sweden.

International Search Report issued in corresponding International application No. PCT/SE2012/050184, date of mailing Apr. 15, 2013.

Written Opinion issued in corresponding International application No. PCT/SE2012/050184, date of mailing Apr. 15, 2013.

Ribeiro, Vinay J., et al., "pathChirp: Efficient Available Bandwidth Estimation for Network Paths (2003)," http://citeseerkist.psu.edu/viewdoc/summary?doi=10.1.1.14.4288.

Cho, Kenjiro, "A Framework for Alternative Queueing: Towards Traffic Management by PC-UNIX Based Routers," Proceedings of the USENIX 1998 Annual Technical Conference (No. 98), New Orleans, LA, Jun. 15, 1998.

Kim, Jin-Ho, et al., "Performance Impact of Course Timer Granularities on QoS Guarantees in Unix-Based Systems," IEEE Transactions on Computers, vol. 52, No. 1, pp. 51-58, Jan. 2003, doi: 10.1109/TC.2003.1159753.

Ribeiro, Vinay, et al., "Multifractal Cross-Traffic Estimation," Proceedings ITC Specialist Seminar on IP Traffic Measurement, Modeling and Management, Sep. 2000, Monterey, CA.

Prasad, Ravi, et al., "Bandwidth Estimation: Metrics, Measurement Techniques, and Tools," IEEE Network, vol. 17, No. 6, pp. 27-35, Nov.-Dec. 2003, doi: 10.1109/MNET.2003.1248658.

Extended European Search Report in corresponding European Patent Application No. EP 12 86 9140 mailed Oct. 16, 2015.

* cited by examiner

CAPACITY ESTIMATES USING BURST-TRAILER TRAINS

TECHNICAL FIELD

The invention relates to methods and devices for transmitting a sequence of data packets in a network.

BACKGROUND

In the art, methods such as BART ("Bandwidth Available in Real Time") and TOPP ("Trains of Packet Pairs") have been developed for estimating capacity in a network and sends a sequence of packets, also known as a probe train, from a transmitting node to a receiving node. The probe train is sent at a specific rate depending on packet size and time interval between the packets in the train. If the send rate of the train is greater than the available path capacity (APC) of the network path, there will be a transient congestion at a bottleneck link. Due to the congestion, the probe-train packets will be buffered in the node just before the bottleneck link which will spread out the packets in time. The probe train will therefore be received by the receiving node at a lower rate than the send rate.

The difference between the preset send rate and the actual receive rate is used for estimating APC and tight link capacity (TLC). In BART and TOPP, the send rate is changed for each train within a specified interval.

Normally, the packet size is held constant during a measurement session. The send rate can then be varied by varying the time interval between the packets. This packet interval is typically measured from the start of a packet to the start of next packet at the transmitting node and from the end of a packet to the end of next packet at the receiving node. The packet interval at the transmitting is illustrated in FIG. 2, where N denotes the total number of packets in the train.

The relations are:
send_time_between_packets=bits_per_packet/send_rate
receive_time_between_packets=bits_per_packet/receive_rate In a network with a TLC=100 Mbps, for instance a network with fast Ethernet links, a typical send rate interval is 40-150 Mbps. Using a packet size of 1500 Byte (12000 bits) these send rates translate to:
40 Mbps: send_time_between_packets=12000 bit/40 Mbps=300 us
150 Mbps: send_time_between_packets=12000 bit/150 Mbps=80 us The receive times will be slightly longer depending on the amount of cross traffic, but not shorter than 12000/100 Mbps=120 us, due to the capacity constraint of the network.

In order to be able to transmit at the maximum send rate of 150 Mbps, the resolution of a clock for the probe trains should be 80 us.

However, many systems have clocks with a resolution in the range of 1 ms. For instance, a mobile phone has a clock which is considerably faster than 1 ms, but this clock handles numerous tasks of the phone, and the operating system is not likely to update a task for estimating transmission capacity more often than once every millisecond. These systems will not be able to accomplish send rates above 12000 bit/0.001 s=12 Mbps, which means that with the current methods they will not be able to perform capacity estimates in networks with higher capacities than about 10 Mbps. Further, the possible send rates are limited by 1 ms steps of the timer, e.g. 12000/0.002=6 Mbps, 12000/0.003=4 Mbps, 12000/0.004=3 Mbps. In high-capacity systems, such as for example Long Term Evolution (LTE) systems, monitoring of utilization of the system capacity is important.

SUMMARY

An object of the present invention is to solve or at least mitigate these problems in the art and provide a method of generating a sequence of data packets where a high send rate can be attained even in a system having a low-resolution clock.

This object is attained in a first aspect of the present invention by a method of transmitting a sequence of data packets in a network. The method comprises the step of selecting a send rate with which the sequence is to be transmitted, and when a first set of data packets of the sequence is transmitted, the transmission is associated with a time stamp. After a predetermined time interval has elapsed from the time stamp associated with the start of transmission of the first set of data packets, a last data packet of the sequence is transmitted. The predetermined time interval is the time required for transmitting the sequence of data packets with the selected send rate.

Further, a device is provided for carrying out the method of the first aspect of the present invention.

Thus, the sequences of data packets—the probe trains—are sent in a pattern where a probe train consists of a first set of packets, also known as a burst, followed by a single last packet, also known as a trailer. Hence, a burst-trailer train is created. The packets can be sent in any appropriate pattern; for instance, the packets can be sent at a particular interval where the points in time where one packet ends and an immediately subsequent packets starts are managed by a timer. Thus, any suitable interval between the packets can be created. However, in an embodiment of the present invention, the first set of data packets will be transmitted back-to-back. In such an embodiment, no timer for managing start/end intervals for subsequent packets is required and central processing unit (CPU) resources can hence be used more effective.

The send rate of a data packet sequence is measured as the number of bits in the packets divided by the sending time between the trailer packet and the first packet of the sequence. The send rate can thus be varied by using different send times for the trailer packet:
transferred_bits=(number_of packets_in_train−1)* packet_size, and
train_send_time=transferred_bits/send_rate.

Thus, referring to the previous example in the background art section where a send rate of 150 Mbps is required; with the method of the present invention, transmission of 12000-bit packets using a clock with 1 ms, and a sequence exemplified to contain 25 packets, will result in a send rate of:
(25−1)*12000/0.001=288 Mbps.

Thus, using 25 packets and a clock resolution of 1 ms, the method of the present invention will by wide margin accomplish a send rate of 150 Mbps. In fact, with these exemplifying numbers, it would be enough to have a system clock with a resolution of 1.92 ms. With the preferred back-to-back approach, the send time of the sequence can be registered using a timer for the trailer packet only. There is no need for a timer to manage the burst packets, since they are sent directly after each other.

In a second aspect of the present invention, a method of transmitting a sequence of data packets in a network is provided. The method comprises the steps of selecting a first send rate with which a first subset of the sequence is to be transmitted, and at least a second send rate with which at least a second subset of the sequence is to be transmitted. Thereafter, a first set of data packets of the sequence is transmitted and a time stamp is associated with the transmission. After a first predetermined time interval has elapsed from the time stamp associated with the first set of data packets, a further data packet of the sequence is transmitted. The first predetermined time interval is the time required for transmitting the first subset of the sequence with the first selected send rate. After a second predetermined time interval has elapsed from the time stamp associated with the first set of data packets, yet a further data packet of the sequence is transmitted. The second predetermined time interval is the time required for transmitting the second subset of the sequence with the second selected send rate.

Further, a device is provided for carrying out the method of the second aspect of the present invention.

Thus, with the second aspect of the present invention several send rates can be attained using only one data packet sequence, where the sequence is transmitted in different subsets, each subset being defined by its own trailer packet. With the second aspect of the present invention, the total number of transmitted packets can be reduced compared to sending several separate data packet sequences, by introducing a burst-trailer train with several trailer packets, where each trailer packet is sent after a specific time period has elapsed from the first data packet in the sequence. Thus, network load—as well as convergence time for subsequent capacity estimates—is decreased. The point in time for transmission of each trailer packet is determined according to a desired packet rate for each subset of the sequence from the first data packet up to the respective trailer packet. Consequently, each trailer packet will define a separate packet rate.

Again, referring to the previous example in the background art section where a send rate of 150 Mbps is required; with the method of the present invention, transmission of 12000-bit packets using a clock with 1 ms, and a sequence exemplified to contain 25 packets, will result in a send rate of:

(25−1)*12000/0.001=288 Mbps.

In the second aspect of the present invention, by adding a further trailer packet at the start of the next clock cycle, the following send rate is attained:

(26−1)*12000/0.002=150 Mbps, and so on.

Advantageously, by adding a further trailer packet, two different send rates are attained by a single data packet sequence. This can be extended to any number of different send rates by adding a corresponding number of trailer packets.

It is noted that the invention relates to all possible combinations of features recited in the claims. Further features of and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
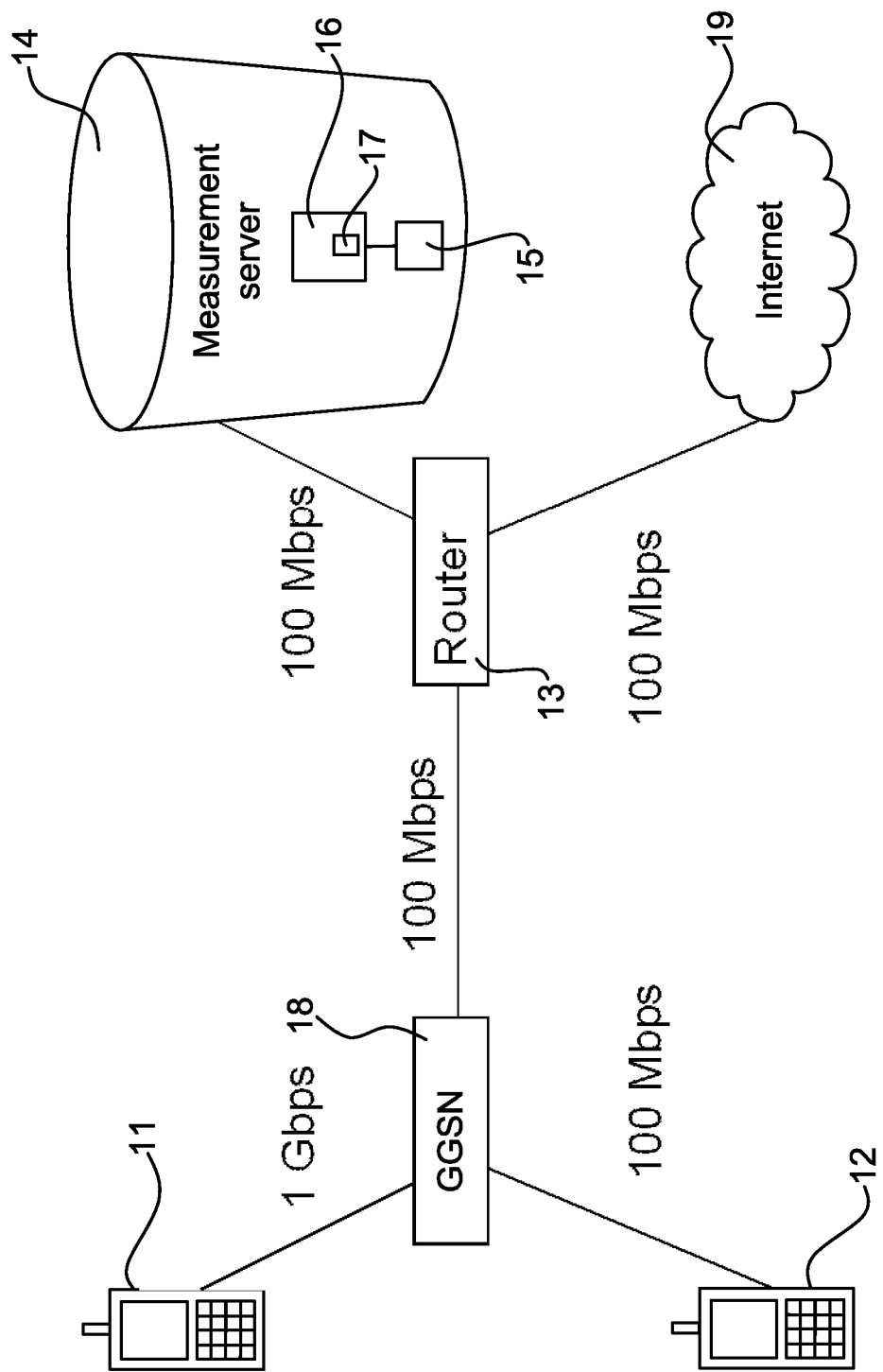
FIG. 1 illustrates a network of terminals communicating with a device, in which network the present invention can be implemented.

FIG. 1 illustrates a pair of terminals 11, 12 communicating via a router 13 with a device 14, being e.g. a measurement server, and further via a Gateway GPRS Support Node (GGSN) 18 acting as an interface between the terminals 11, 12 located in a General Packet Radio Service (GPRS) wireless data network and networks such as the Internet 19, for finding bottleneck links throughout the network. The bit rate of each respective link is indicated in FIG. 1 for illustrative purposes. Hence, even though it is possible to transmit data with a rate of 1 Gbps between terminal 11 and GGSN 18, a user wishing to access the Internet 19 may still experience limitations in bandwidth since the link between the GGSN 18 and the router 13 as well as the link between the router 13 and the Internet 19 allows substantially lower bit rates. The method of transmitting a sequence of data packets according to embodiments of the present invention can be undertaken at the respective terminal 11, 12 as well as at the server 14. In fact, the method can be implemented in any appropriate device where a need for estimating capacity in a network is present, given that the device has the appropriate computing capabilities. Thus, the generation, transmission and management of data packets is handled by a data packet controller 15 in the server 14. In practice, the bit rate controller 15 is embodied on the form of one or more microprocessors arranged to execute a computer program 17 downloaded to a suitable storage medium 16 associated with the microprocessor, such as a RAM, a Flash memory or a hard disk. The microprocessor 15 is arranged to at least partly carry out the method according to embodiments of the present invention when the appropriate computer program 17 comprising computer-executable components is downloaded to the memory 16 and executed by the microprocessor 15. The storage medium 16 may be a computer program product comprising the computer program 17. Alternatively, the computer program 17 may be transferred to the storage medium 16 by means of a suitable computer program product, such as a floppy disk, compact disc or a memory stick. As a further alternative, the computer program 17 may be downloaded to the storage medium 16 over a network. The microprocessor 15 may alternatively be embodied in the form of an application specific integrated circuit (ASIC), a field-programmable gate array (FPGA), a complex programmable logic device (CPLD), etc. As previously mentioned, the method according to embodiments of the present invention is typically also implemented at the respective terminal 11, 12, each of which comprises (even though not shown in FIG. 1) a corresponding microprocessor 15, storage medium 16 and computer program 17.

Figure 2:
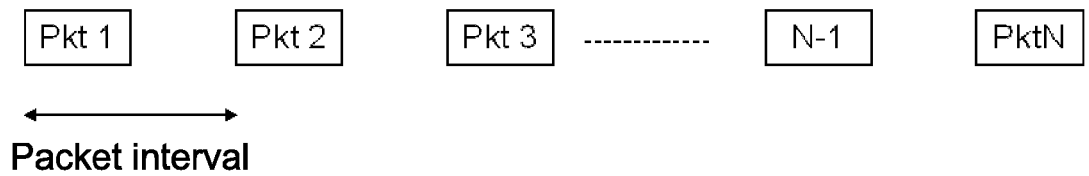
FIG. 2 illustrates a prior art approach of generating data packets for subsequent link capacity estimation.

FIG. 2 illustrates a prior art approach of generating data packets as previously discussed. The packet size and the time interval between the packets are held constant during a measurement session. The send rate can then be varied by varying the time interval between the packets Pkt 1, Pkt 2, Pkt 3, etc. This packet interval is typically measured from the start of a packet Pkt 1 to the start of next packet Pkt 2 at the transmitting node and from the end of a packet Pkt 1 to the end of next packet Pkt 2 at the receiving node. The relations are:

send_time_between_packets=bits_per_packet/send_rate
receive_time_between_packets=bits_per_packet/receive_rate In a network with a TLC=100 Mbps a typical send rate interval is 40-150 Mbps. Using a packet size of 1500 Byte (12000 bits) these send rates translate to:

40 Mbps: send_time_between_packets=12000 bit/40 Mbps=300 us
150 Mbps: send_time_between_packets=12000 bit/150 Mbps=80 us In order to be able to transmit at the maximum send rate of 150 Mbps, the resolution of a clock for the probe trains should be 80 us, which may be problematic in many systems.

Figure 3:
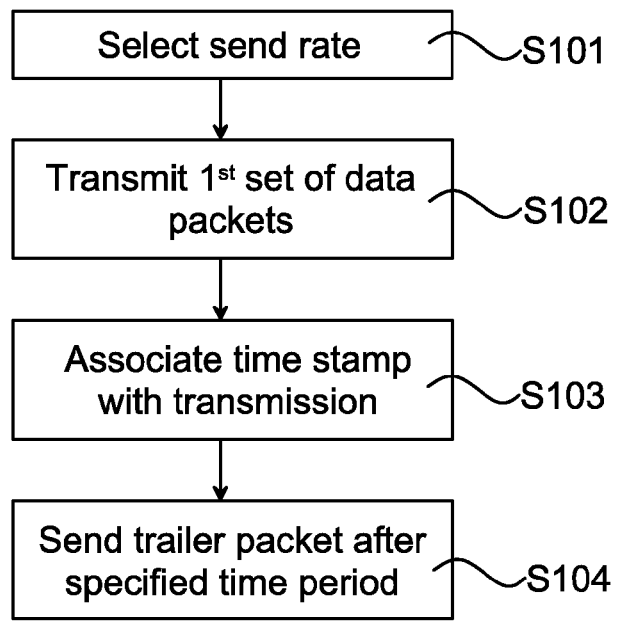
FIG. 3 illustrates a flow chart of a method according to an embodiment of the present invention.
Figure 4:
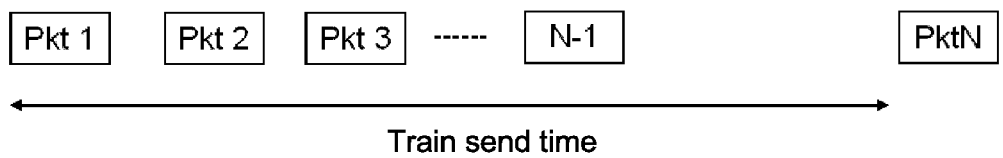
FIG. 4 illustrates a selected structure for the data packets sent according to the method illustrated in FIG. 3.

FIG. 3 illustrates a flow chart of a method according to an embodiment of the present invention where a terminal 11, 12 desires to make an estimate of its link capacity. Reference is further made to FIG. 4 illustrating the structure of the packets sent according to the method illustrated in FIG. 3. In a first step S101, a send rate is selected with which a sequence of data packets is to be transmitted. It should be noted that the send rate may have been determined in advance. In step S102, a first set of data packets Pkt 1, Pkt 2, Pkt3, . . . , Pkt N−1 of the sequence is transmitted, and in step S103 the transmission is associated with a time stamp. After a predetermined time interval has elapsed from the time stamp associated with the start of transmission of the first set of data packets Pkt 1, Pkt 2, Pkt3, . . . , Pkt N−1, a last data packet Pkt N of the sequence is transmitted in step S104. The predetermined time interval is the time required for transmitting the sequence of data packets with the selected send rate. In FIG. 4, the packets are sent at a particular interval where the points in time where one packet ends and an immediately subsequent packets starts are managed by a timer. Thus, the packets are sent with a selected time interval passing between the packets.

Figure 5:
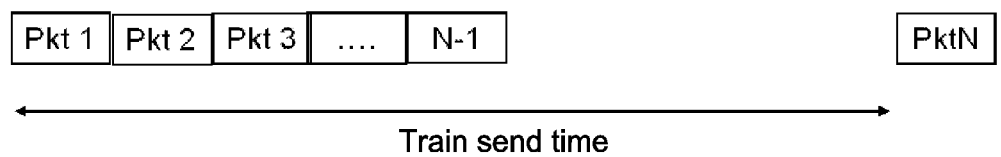
FIG. 5 illustrates a further selected structure for the data packets sent according to the method illustrated in FIG. 3.

FIG. 5 illustrates a selected structure of transmitted data packets according to a further embodiment of the present invention, where the data packets Pkt 1, Pkt 2, Pkt3, . . . , Pkt N−1 of the first set of the sequence sent in step S102 are sent back-to-back, i.e. without any time interval passing between the packets. Again, after a predetermined time interval has elapsed from the time stamp associated with the start of transmission of the first set of data packets Pkt 1, Pkt 2, Pkt3, . . . , Pkt N−1, a last data packet Pkt N of the sequence is transmitted in step S104. The predetermined time interval is the time required for transmitting the sequence of data packets with the selected send rate.

The send rate of a data packet sequence is measured as the number of bits in the packets divided by the sending time between the trailer packet and the first packet of the sequence. The send rate can thus be varied by using different send times for the trailer packet:

transferred_bits=(number_of_packets_in_train−1)*packet_size, and
train_send_time=transferred_bits/send_rate.

Correspondingly, the receive time of a train is expressed as:

train_receive_time=transferred_bits/receive_rate

As previously has been shown, transmission of 12000-bit packets using a clock with 1 ms, and a sequence exemplified to contain 25 packets, will result in a send rate of:

(25−1)*12000/0.001=288 Mbps.

Thus, using 25 packets and a clock resolution of 1 ms, the method of the present invention will easily accomplish a send rate of 150 Mbps.

In order to make estimates of link capacity, send rate granularity must be accomplished. From a given train send time the corresponding send rate is:

send_rate=transferred_bits/train_send_time

For trains with 25 packets there will be the following possible send rates:
1 ms: 12000 bit*(25−1)/1 ms=288 Mbps,
2 ms: 144 Mbps,
3 ms: 96 Mbps,
4 ms: 72 Mbps,
5 ms: 58 Mbps, and so on.

It should be noted that a finer granularity can be accomplished using even longer trains/sequences.

Thus, when sending a burst-trailer train according to embodiments of the present invention as illustrated in FIGS. 4 and 5, it is clear that it is not necessary to spread the packets Pkt 1, Pkt 2, Pkt 3, . . . , Pkt N of a sequence evenly with the same rate for each packet. The intermediate packets between the first packet Pkt 1 and the last, trailing packet Pkt N can in fact be transferred in any pattern. This implies that the time resolution will only impact the sending of the first packet Pkt 1 and the trailer packet Pkt N of a sequence. All the intermediate packets can be sent at any appropriate time between those packets. The train/sequence is assumed to be short enough not causing overflow in buffers of the nodes of the network path.

The algorithm for sending a sequence/train as shown in FIG. 5, where N is the number of packets in a sequence, can be summarized as:
1) train_send_time=(N−1)*packet_size*8/send_rate,
2) Start a timer with train_send_time,
3) Send the first N−1 packets in the sequence directly after each other, and
4) When the timer is ready, i.e. when the predetermined time interval required for transmitting the sequence of data packets with the selected send rate has elapsed, send the last, trailing packet N of the sequence.

When sending a burst-trailer train in a back-to-back manner, there is no need for activating a timer for the intermediate packets located between the first and the last packet.

Figure 6:
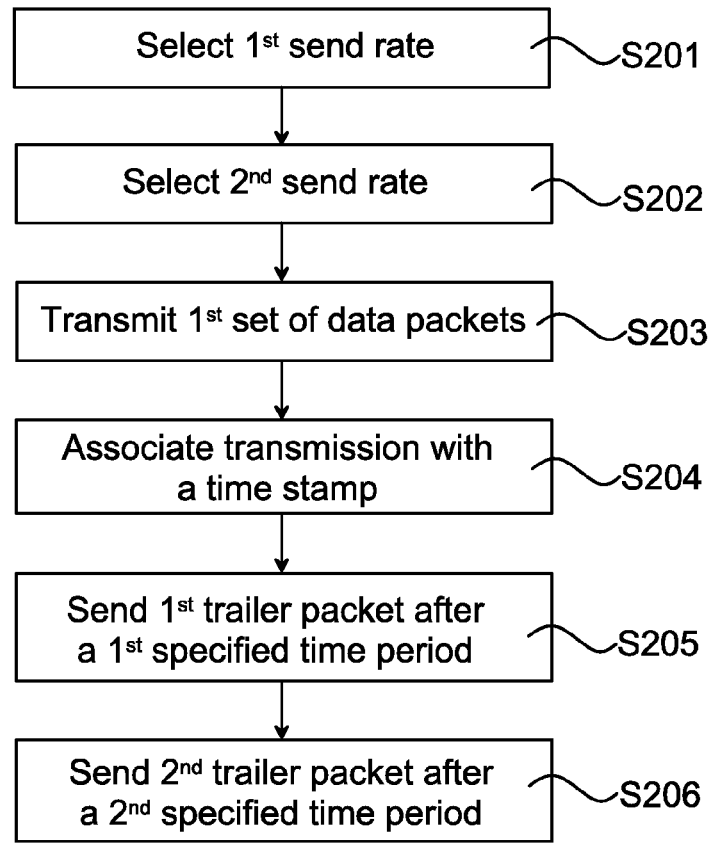
FIG. 6 illustrates a flow chart of a method according to a further aspect of the present invention.
Figure 7:
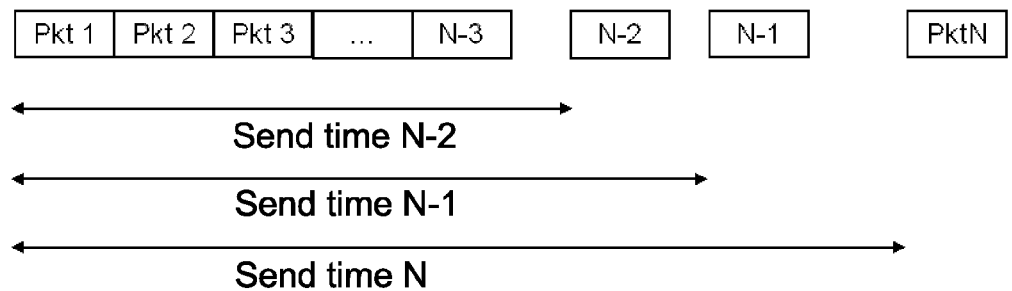
FIG. 7 illustrates a selected structure for the data packets sent according to the method illustrated in FIG. 6.

FIG. 6 illustrates a flow chart of a method according to a further aspect of the present invention where a terminal 11, 12 desires to make an estimate of its link capacity. Reference is further made to FIG. 7 illustrating the structure of the packets sent according to the method illustrated in FIG. 6. In a first step S201, a first send rate is selected with which a first subset of the sequence of data packets is to be transmitted. It should be noted that the send rate may have been determined in advance. In step S202, at least a second send rate is selected with which at least a second subset of the sequence is to be transmitted. The number of further send rates to select depends on the number to be attained by the sequence. In step S203, a first set of data packets Pkt 1, Pkt 2, Pkt 3, . . . , Pkt N−3 of the sequence is transmitted, and in step S204 the transmission is associated with a time stamp. After a first predetermined time interval has elapsed from the time stamp associated with the start of transmission of the first set of data packets Pkt 1, Pkt 2, Pkt 3, . . . , Pkt N−3, a further data packet Pkt N−2 of the sequence is transmitted in step S205. The first predetermined time interval is the time required for transmitting the first subset Pkt 1, Pkt 2, Pkt 3, . . . , Pkt N−3, Pkt N−2 of the sequence of data packets with the first selected send rate. After a second predetermined time interval has elapsed from the time stamp associated with the first set of data packets Pkt 1, Pkt 2, Pkt 3, . . . , Pkt N−3, yet a further data packet Pkt N−1 of the sequence is transmitted in step S206. The second predetermined time interval is the time required for transmitting the second subset Pkt 1, Pkt 2, Pkt 3, . . . , Pkt N−3, Pkt N−2, Pkt N−1 of the sequence with the second selected send rate. This continues until the last, trailing packet Pkt N has been transmitted.

FIG. 7 illustrates that the data packets Pkt 1, Pkt 2, Pkt3, . . . , Pkt N−3 of the first set of the sequence are sent back-to-back. Again, as was discussed in connection to FIG. 4, the data packets contained in the first set could alternatively be transmitted with a selected time interval passing between the packets.

Thus, several send rates can be achieved using a single train/sequence by creating a burst-trailer train with several trailer packets. There is first the burst part of the train that creates the bulk of the probe traffic. Hence, a first send rate is created between the very first packet sent and the first trailer packet, a second send rate is created. The descending nature of the send rates is useful, since any congestion in a train should be able to influence the different send rates with different strains. One example is when the first send rate is 96 Mbps and the second probe rate is 58 Mbps. If the available link capacity is 70 Mbps, the first subset of the train with the send rate of 96 Mbps will experience a strain, while the second subset with the send rate of 58 Mbps will not. The method according to the further aspect of the present invention can be used in systems with different clock resolutions.

As a comparison with the previously described subject-matter, a possible implementation in a system with a resolution of 1 ms would be to send the first set of data packets of the sequence and subsequently send trailer packets each 1 ms. Note that each send rate will depend on an increasing number of packets. Starting with 25 packets for the first trailer packet, the send rates will be:
1 ms: 12000 bit*(25−1)/1 ms=288 Mbps,
2 ms: 12000 bit*(26−1)/2 ms=150 Mbps,
3 ms: 12000 bit*(27−1)/3 ms=104 Mbps,
4 ms: 12000 bit*(28−1)/4 ms=81 Mbps,
5 ms: 12000 bit*(29−1)/5 ms=67 Mbps, and so on.

The algorithm for sending a sequence/train as shown in FIG. 7, where N is the number of packets in a sequence, K is the number of trailer packets and send_rate[k] are the send rates in descending order, can be summarized as:
1) Set timer value T=0
2) For k=1 to K
a.  train_send_time=(N−K+k−1)*packet_size*8/send_rate[k]
b. Start a timer with T=train_send_time−T
c. If k=1 then send the first N−K packets directly after each other
d. When the timer is ready send packet N−K+k of the sequence.

Thus, the method of this further aspect of the present invention advantageously achieves a plurality of different send rates with a single train.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of transmitting, by a device, a sequence of data packets for estimating capacity in a network, the method comprising the steps of:
   selecting a send rate with which the sequence is to be transmitted to estimate the capacity in the network;
   transmitting a first set of data packets of the sequence;
   setting a time stamp for a start of the transmission of the first set of data packets; and
   transmitting a last data packet of the sequence after a predetermined time interval has elapsed from the time stamp, where said predetermined time interval is the time required for transmitting the sequence of data packets with the selected send rate,
   wherein the selected send rate exceeds a send rate between any two packets in the first set of data packets that can be achieved based on a time resolution of a clock of the device.

2. The method of claim 1, wherein the step of transmitting the first set of data packets of the sequence comprises:
   transmitting the first set of data packets of the sequence back-to-back without any time interval passing between packets in the first set of data packets.

3. The method of claim 1, wherein the step of transmitting the first set of data packets of the sequence comprises:
   transmitting the first set of data packets with a selected time interval between the data packets.

4. The method of claim 1, wherein the step of setting the time stamp comprises:
   starting a timer at the instant of transmission of the first data packet of the sequence.

5. A method of transmitting a sequence of data packets for estimating capacity in a network, said data packets having a predetermined size, the method comprising the steps of:
   selecting a first send rate with which a first subset of the sequence is to be transmitted to estimate the capacity in the network;
   selecting at least a second send rate with which at least a second subset of the sequence is to be transmitted to estimate the capacity in the network, wherein the first send rate is greater than the second send rate;
   transmitting a first set of data packets of the sequence;
   setting a time stamp for a start of the transmission of the first set of data packets;
   controlling transmission of a further data packet of the sequence so that the further data packet is transmitted after a first predetermined time interval has elapsed from the time stamp, where said first predetermined time interval is the time required for transmitting the first subset of the sequence with the first selected send rate; and
   controlling transmission of yet a further data packet of the sequence so that the yet the further data packet is transmitted after a second predetermined time interval has elapsed from the time stamp, where said second predetermined time interval is the time required for transmitting the at least second subset of the sequence with the at least second selected send rate.

6. The method of claim 5, wherein the step of transmitting the first set of data packets of the sequence comprises:
transmitting the first set of data packets of the sequence back-to-back without any time interval passing between packets in the first set of data packets.

7. The method of claim 5, wherein the step of transmitting the first set of data packets of the sequence comprises:
transmitting the first set of data packets with a selected time interval between the data packets.

8. The method of claim 5, wherein the step of setting the time stamp comprises:
starting a timer at the instant of transmission of the first data packet of the sequence.

9. A device for transmitting a sequence of data packets for estimating capacity in a network, the device comprising a processing unit being arranged to:
select a send rate with which the sequence is to be transmitted to estimate the capacity in the network;
transmit a first set of data packets of the sequence;
set a time stamp for a start of the transmission of the first set of data packets; and
transmit a last data packet of the sequence after a predetermined time interval has elapsed from the time stamp associated, where said predetermined time interval is the time required for transmitting the sequence of data packets with the selected send rate,
wherein the selected send rate exceeds a send rate between any two packets in the first set of data packets that can be achieved based on a time resolution of a clock of the device.

10. The device of claim 9, the processing unit being arranged to:
transmit the first set of data packets of the sequence back-to-back without any time interval passing between packets in the first set of data packets.

11. The device of claim 9, the processing unit being arranged to:
transmit the first set of data packets with a selected time interval between the data packets.

12. The device of claim 9, the processing unit being arranged to:
start a timer at the instant of transmission of the first data packet of the sequence.

13. A device for transmitting a sequence of data packets for estimating capacity in a network, the device comprising a processing unit being arranged to:
select a first send rate with which a first subset of the sequence is to be transmitted to estimate the capacity in the network;
select at least a second send rate with which at least a second subset of the sequence is to be transmitted to estimate the capacity in the network, wherein the first send rate is greater than the second send rate;
transmit a first set of data packets of the sequence;
set a time stamp for a start of the transmission of the first set of data packets;
control transmission of a further data packet of the sequence so that the further data packet is transmitted after a first predetermined time interval has elapsed from the time stamp, where said first predetermined time interval is the time required for transmitting the first subset of the sequence with the first selected send rate; and
controlling transmission of yet a further data packet of the sequence so that the yet the further data packet is transmitted after a second predetermined time interval has elapsed from the time stamp, where said second predetermined time interval is the time required for transmitting the at least second subset of the sequence with the at least second selected send rate.

14. The device of claim 13, the processing unit being arranged to:
transmit the first set of data packets of the sequence back-to-back without any time interval passing between packets in the first set of data packets.

15. The device of claim 13, the processing unit being arranged to:
transmit the first set of data packets with a selected time interval between the data packets.

16. The device of claim 13, the processing unit being arranged to:
start a timer at the instant of transmission of the first data packet of the sequence.

17. A non-transitory computer readable medium comprising a computer program, which when executed on a processor, cause the processor to perform the method steps recited in claim 1.

18. The method of claim 2, wherein the step of transmitting of the first set of data packets of the sequence further comprises:
waiting until after the predetermined time interval has elapsed from the time stamp associated with the first set of data packets transmitted back-to-back, then transmitting the last data packet of the sequence.

19. The device of claim 10, the processing unit being arranged to:
wait until after the predetermined time interval has elapsed from the time stamp associated with the first set of data packets transmitted back-to-back, then transmit the last data packet of the sequence.

* * * * *